(12) United States Patent
Cox

(10) Patent No.: US 6,253,690 B1
(45) Date of Patent: Jul. 3, 2001

(54) TREE EXCAVATOR AND TRANSPLANTER

(75) Inventor: Thomas Cox, Spring, TX (US)

(73) Assignee: Environmental Tree and Design, Inc., Tomball, TX (US)

( * ) Notice: Subject to any disclaimer, the term of this patent is extended or adjusted under 35 U.S.C. 154(b) by 0 days.

(21) Appl. No.: 09/477,513

(22) Filed: Jan. 4, 2000

(51) Int. Cl.$^7$ ............................................. A01G 23/02
(52) U.S. Cl. ................................................ 111/101; 37/302
(58) Field of Search ........................... 37/301, 302, 3, 37/195, 466, 187, 188; 111/101, 100, 102, 103, 900; 47/1.01

(56) References Cited

U.S. PATENT DOCUMENTS

| | | |
|---|---|---|
| 3,017,707 * | 1/1962 | Sigler et al. ............................. 37/302 |
| 3,017,708 * | 1/1962 | Gardner .................................. 37/302 |
| 3,558,177 * | 1/1971 | Snead .................................... 111/101 |
| 4,031,637 * | 6/1977 | Stocker .................................. 37/302 |
| 4,226,033 | 10/1980 | DeHaan . |
| 4,286,398 | 9/1981 | Lemond et al. . |
| 4,301,605 | 11/1981 | Newman . |
| 4,341,025 | 7/1982 | Stocker . |
| 4,403,427 | 9/1983 | Dahlquist . |
| 4,625,662 * | 12/1986 | Heinzen ............................... 37/302 X |
| 4,658,518 | 4/1987 | Korenek . |
| 5,081,941 | 1/1992 | Weeks . |
| 5,485,691 | 1/1996 | Stevens et al. . |
| 5,600,904 * | 2/1997 | Bowling ............................. 111/101 X |
| 5,957,213 * | 1/1962 | Loraas et al. ...................... 111/101 X |

* cited by examiner

*Primary Examiner*—Victor Batson
(74) *Attorney, Agent, or Firm*—Browning Bushman

(57) ABSTRACT

This invention relates generally to an apparatus and a method for excavating and transplanting a live tree. The invention relates more specifically to equipment which utilizes curved ground piercing blades moveably supported on a ring assembly positioned around a tree to be transplanted, the blades being forced and guided down into the ground to completely encompass a tree root ball which can thereafter be lifted out of the ground and transported for subsequent transplantation. Both the apparatus and the method facilitate the excavation and transplantation of trees with low limbs and crooked trunks to and/or from uneven or sloping terrain, and may be utilized with any of the prime movers of adequate towing capacity available at an excavation site.

38 Claims, 7 Drawing Sheets

TREE EXCAVATOR AND TRANSPLANTER

FIELD OF THE INVENTION

This invention generally relates to apparatus and methods for excavating and transplanting trees. The invention relates more specifically to equipment which utilizes curved ground piercing blades moveably supported on a ring assembly positioned around a tree to be transplanted, the blades being forced and guided down into the ground to completely encompass a tree root ball which can thereafter be lifted out of the ground and transported for subsequent transplantation.

BACKGROUND OF THE INVENTION

Land developers are becoming more interested in trying to save trees on the land they are developing. In fact, some communities, such as Austin Texas, have an ordinance protecting trees 19 inches in diameter or larger. Since such trees are usually in the way of the planned construction, they must be moved to another location on the site or elsewhere. For the trees to have a reasonable chance of surviving, a substantial root ball must be moved with the tree.

Mechanical devices for excavating trees have existed for decades. However, these devices are limited in application, as they may conventionally only excavate small trees and shrubs. Larger trees, having trunks greater than 15 inches in diameter, commonly require a more manual method for excavation called "round-ball" or boxing." In this method, a large trench several feet in width and depth is be excavated around the tree. Long pipes or wooden members are then horizontally driven at the bottom of the trench from one side of the tree to another, forming a support framework underneath the tree. Cranes may then lift this framework and the tree out of the ground for subsequent transplantation. The method is very tedious and labor intensive, requiring the aid of multiple workers and tools, and is particularly disfavored during mild flooding, on sloping terrain, or with medium rocky or clay-type soils. Thus, strides were taken to automate the process of large tree excavation.

Previous tree moving equipment such as the DeHaan device, U.S. Pat. No. 4,226,033, the Lemond device, U.S. Pat. No. 4,286,398, the Newman device, U.S. Pat. No. 4,301,605, the Stocker device, U.S. Pat. No. 4,341,025, the Dahiquist device, U.S. Pat. No. 4,403,427, the Weeks device, U.S. Pat. No. 5,081,941, and the Stevens device, U.S. Pat. No. 5,485,691, employed a plurality of blades that severed the root ball from the ground and formed a supporting structure for the root ball and tree as it was lifted out of the ground and moved to its new location. The blades were guided into the ground by various types of guide members that engaged the blade over a substantial portion of their length. This resulted in significant structure high above the ground. This structure is a disadvantage to utilizing the prior art, such that trees with low limbs frequently require the limbs to be removed in order be transplanted.

The Korenek tree transplanter, U.S. Pat. No. 4,658,518, attempted to alleviate this problem, but it also has its disadvantages. Use of the Korenek equipment can be limited when utilized on terrain that is not level because the mast requires the ring assembly, tree and root ball to be raised vertically. The problem may become evident when the apparatus is utilized on terrain having more than minimal slope, such as that exceeding 10 degrees. Many applications require the transplantation of a tree either from or to a terrain that has a significant slope, such that the blades of the previous equipment might not be properly aligned with the axis of the tree, thereby resulting in excavating a root ball insufficient to protect the tree and ensure successful transplantation. Since the ring structure and blades of the prior art are set in a given plane in relation to the terrain, the Korenek equipment may not allow the excavation of a tree and adequate root ball from severely sloped terrain, such as the side of a mountain. Further problems may arise with the Korenek equipment when the tree to be excavated and has a crooked trunk or significant branches which the mast would interfere with, such that in positioning the transplanting apparatus around the tree, the trunk may force the misalignment of the ring structure and blades in relation to the root ball, resulting in the excavation of an inadequate or asymmetrical root ball, and thereby sacrificing the health of the tree and decreasing the likelihood of successful transplantation.

Since the Korenek apparatus includes a mast on which a ring structure vertically raises and lowers in relation to the ground. The mast stands in a strictly vertical plane and may interfere with the limbs of large trees, possibly injuring the tree limbs or requiring the removal of several tree limbs in order to accurately position the apparatus around the tree. Further, this problem makes such devices particularly disadvantageous for use in nurseries where it is desirable to plant and cultivate trees as closely as possible to utilize the available land most efficiently. Because of the space required for maneuvering and positioning conventional devices to remove such trees, the trees must be planted a greater distance apart than would generally be desirable from the standpoint of utilizing available space in the most efficient manner possible.

Additionally, those skilled in the art have learned that the mast arrangement is often not strong or rigid enough to use the apparatus with large trees, such that additional braces have been attached between the mast and various points on the ring structure. These additional supports may also interfere with the limbs of the tree to be excavated, resulting in the need to again remove several limbs prior to excavation. To desirably position the ring assembly of the Korenek device for a tree excavating operation, the lower end of the mast is closely adjacent the ground surface. This close spacing e.g., approximately 8 inches, presents ground clearance problems when using the equipment, particularly in muddy environments.

Moreover, once a tree is excavated with the Korenek equipment, the weight of the excavated tree bears substantially upon the mast. To counteract the moment about the mast created by the excessive weight of the tree, a particular prime mover must be selected to prevent the mast from breaking and to prevent the excavated tree from falling backwards to the ground. This limitation in selecting a prime mover of appropriate weight to prevent such malfunction is particularly disfavored to those skilled in the art, since many applications have limitations in the availability of prime movers of various weights.

The Korenek apparatus is also susceptible to malfunctions attributed to wear and fracture of the blade guides which guide the blades into the ground. The guides in the Korenek apparatus receive excessive loading from the blades, a problem intensified by the minimal contact area between the blades and the guides. This loading creates excessive wear on the guides, resulting in the failure of the guides or blades, and thereby driving up maintenance requirements of the apparatus, decreasing the reliability of the device, and ultimately increasing operating costs of the device. The guides also provide no effective means for removing debris that becomes lodged between the guides and the blades during use, a factor that leads to further malfunction or fracture of the apparatus. Also, as the Korenek transplanting apparatus is repeatedly used and the force of the blades on the guides and debris accumulates between the guides and the blades, significant wear is effected on the guides, such that the engagement of the guides and the blades is lessened, thereby preventing the blades from being accurately driven into the ground. This also results in the inadequate excavation of the root ball and diminishes the likelihood of tree survival.

Finally, utilization of the Korenek tree transplanter can be a tedious process, requiring multiple bolting and unbolting of the ring sections to and from one another. While tree excavating apparatus are often utilized in the construction and nursery industries where time is of the essence, a tedious procedure is not cost effective. Utilizing this equipment requires the additional utilization of multiple tools and several people, thereby increasing both the complexity, execution time and cost of excavating a single tree.

It is highly desirable to provide a tree excavating and transplanting apparatus that is easily operated and highly reliable, that may be utilized on terrain of even the most severe slope with trees having severely crooked trunks, that requires little time and minimal trimming to execute the excavation of trees of any size, and that overcomes the wear and maintenance problems inherent in the prior art.

SUMMARY OF THE INVENTION

A preferred machine for excavating and transplanting large trees involves a plurality of blades moveably supported around an annular ring assembly which is positioned around a tree by a prime mover. The blades sever a root ball from the ground and form a supporting structure for the root ball and tree as it is lifted out of the ground and moved to a new location. Typically, the annular ring assembly includes a front rigid section and two rear gate sections pivotally attached to the rigid section, such that the gate sections can be rotated open to allow the machine to be positioned around the tree.

The present invention provides a machine and method for excavating and transplanting large trees, and affords solutions to some of the challenges of excavating and transplanting trees experienced in the prior art. This invention offers advantages over the prior art in that it may facilitate the excavation and transplantation of trees having low limbs or crooked trunks to and/or from substantially sloped terrain. The invention may also more accurately guide the plurality of blades into the ground, thereby increasing the reliability of the machine and the accuracy with which a root ball is excavated, thus increasing the likelihood of tree survival. The invention may also substantially automate the excavating process, thereby eliminating the need for numerous tools and workers during tree transplantation.

A primary object of this invention is to provide an excavating machine that offers the ability to excavate and transplant large trees to and from uneven or sloping terrain. The preferred embodiment disclosed affords this characteristic through the arrangement of four hydraulic elevating cylinders, two elevating cylinders each attached at one end to a front rigid section of a ring assembly which moveably supports a plurality of ground piercing blades, the other two elevating cylinders attached at one end to a rear rigid section of the ring assembly. The two front elevating cylinders may be pivotally attached at an opposing end to an over-center neck mechanism which is attached at one end to the ring assembly and at an opposing end to a moveable base. The two rear hydraulic elevating cylinders are each attached at an opposing end to a respective moveable base. By extending the elevating cylinder pistons to different lengths as necessary to best position the ring assembly around the tree, the ring assembly may maintain a substantially horizontal position regardless of the profile of the terrain. Additionally, the elevating cylinders may in the same manner position the ring assembly in a plane at an angle relative to level terrain in order to excavate a root ball of appropriate grade for transplanting the tree to a location of different grade. This feature is of particular advantage over the prior art, in that it may facilitate the excavation of a tree located on a significant slope or where the terrain elevation varies from one side of the tree to another. Additionally, the feature is particularly useful when a tree has been excavated from a substantially level terrain and needs to be transplanted to a location that is severely sloped or uneven. In both cases, this advantage has aesthetic benefits, in that the grade of the transplanted tree may substantially match that of the surrounding transplant location, such that the tree may appear to have actually grown in that location. Additionally, in both of the above scenarios, the likelihood of tree survival may be increased since an adequate root ball will have been more accurately excavated than previously possible with the prior art.

Another objective of this invention is to provide a tree excavating and transplanting machine that can excavate trees with low limbs or crooked trunks. The present invention has no structure above the top of the plurality of blades when the ring assembly is in a lowered position. This lack of structure may facilitate use of the present invention to transplant trees that have low limbs, whereas the prior art required the removal of such low limbs to avoid interference between the limbs and the tall vertical structure of the prior art. Additionally, the combination of the low structure height and the pivoting ring assembly discussed above may allow the plurality of blades and ring assembly to be more accurately positioned around a tree, thereby further encouraging the excavation of a root ball sufficient to ensure the likelihood of tree survival.

It is a further object of the present invention to provide a tree excavator and transplanter capable of use with any one of several prime movers available at an excavation site and having an adequate towing capacity. This characteristic is characterized in the preferred embodiment of the present invention through the provision of an integral hydraulic power unit, consisting of a motor, a hydraulic fluid pump and a hydraulic fluid reservoir. This feature is particularly advantageous over the prior art, in that the present invention is not dependent upon a prime mover or other source for hydraulic or electric power. This may enable the tree excavating and transplanting machine to be used with almost any prime mover available at the excavation site. Additionally, the plurality of blades and ring assembly of the present invention may completely support the weight of the excavated tree. This feature is favorable over the prior art, in that the selection of a prime mover may be independent of the weight of the excavated tree, but may instead be selected solely on the basis of the towing capacity of the prime mover. This feature is advantageous in that it may eliminate the limitations in the prior art in selecting a prime mover, and may facilitate the use of a tree excavator and transplanter with any one of several prime movers available at the excavation site.

It is a further objective of this invention to provide blade guides with increased reliability and maintainability. The preferred embodiment disclosed affords this characteristic through the provision of a plurality of blade guides that contact a respective one of the plurality of blades over the width of the blade. This is an advantage over the prior art in that the previous equipment provided only point contact between the blades and guides, such that the blades applied significant loading on the guides during excavation. The present invention may increase the reliability of the blade guides by providing a larger contact area between the blades and the guides, such that the forces resulting from moving the blades during excavation are applied over a larger area than that in the previous equipment.

It is a further objective of this invention to provide adjustability in the engagement of the guides and the blades. The preferred embodiment disclosed affords this characteristic through the provision of a plurality of guide adjustment members. The plurality of guide adjustment members may allow the guides to be adjusted radially inward and outward, thereby increasing or decreasing the engagement of the guides with the blades. This feature is advantageous over the prior art, in that the wear on the guides from prolonged used of the machine may be compensated for by adjusting the guides closer to the blades and increasing the engagement of the guides with the blades. Additionally, the feature is advantageous over the prior art in that the guides may be temporarily adjusted away from the blades in order to remove the accumulation of debris resulting from prolonged use of the machine.

It is a further objective of this invention to substantially automate the excavation process. The preferred embodiment disclosed affords this characteristic through the provision of a system of hydraulic cylinders. A pair of hydraulic gate cylinders each attached at one end to the annular ring assembly and at an opposing end to a respective gate section pivotally attached to the ring assembly rigid section may provide the automation of the movement of the gate sections between an open position and a closed position. A pair of hydraulic securing cylinders each moving a securing pin between a secured position and an unsecured position may provide the automation of securing the gate sections to the ring assembly rigid section. Further, a hydraulic locking cylinder moving a locking pin between a locked position and an unlocked position may provide the automation of locking the gate sections to one another. Finally, a plurality of hydraulic blade cylinders each attached at one end to a respective one of the plurality of blades and attached at an opposing end to the ring assembly may provide the automation of digging the plurality of blades into the ground underneath the tree. These features are favorable over the prior art in that a single worker may operate the cylinder systems while remaining at a single position relative to the apparatus. This may eliminate the need to manually configure the present invention into an excavating configuration, leaving only the removal and reattachment of one end of each of the plurality of blade cylinders to a respective one of the plurality of blades in a step by step manner to force the blades into the ground. In addition, these features may increase the speed at which the excavating machine may be operated to excavate a tree, in that many of the steps in excavating the tree have been automated and may be performed by a single worker in a central location, and that the hydraulic cylinders may be actuated in a matter of seconds, whereas the prior art utilized threaded fastener configurations for securing the gate sections to the ring assembly rigid section and for locking the two gate sections to one another. These features are also an advantage over the prior art because they may decrease the number of workers required to excavate a tree. They are also advantageous over the prior art in that they may decrease the number of additional tools necessary to complete the excavation, whereas using the prior art excavate a tree required additional tools to configure the gate sections, secure the gate sections to the ring assembly rigid section, and lock the gate sections to one another. Finally, these automated features may allow the forces required to actuate these mechanisms which are attributed to slight misalignment or accumulation of debris to be overcome more easily, since the forces may be overcome by hydraulic power as opposed to human power.

The forgoing disclosure and description of the machine for excavating and transplanting large trees and components is illustrative and explanatory thereof This invention is not intended to be limited to the illustrated and discussed embodiments, as one skilled in the art will appreciate that various changes in the size, shape and materials, as well as in the details of the construction and combinations of features of the tree excavating and transplanting machine, may be made without departing from the spirit of the invention.

DETAILED DESCRIPTION OF PREFERRED EMBODIMENTS

Figure 1:
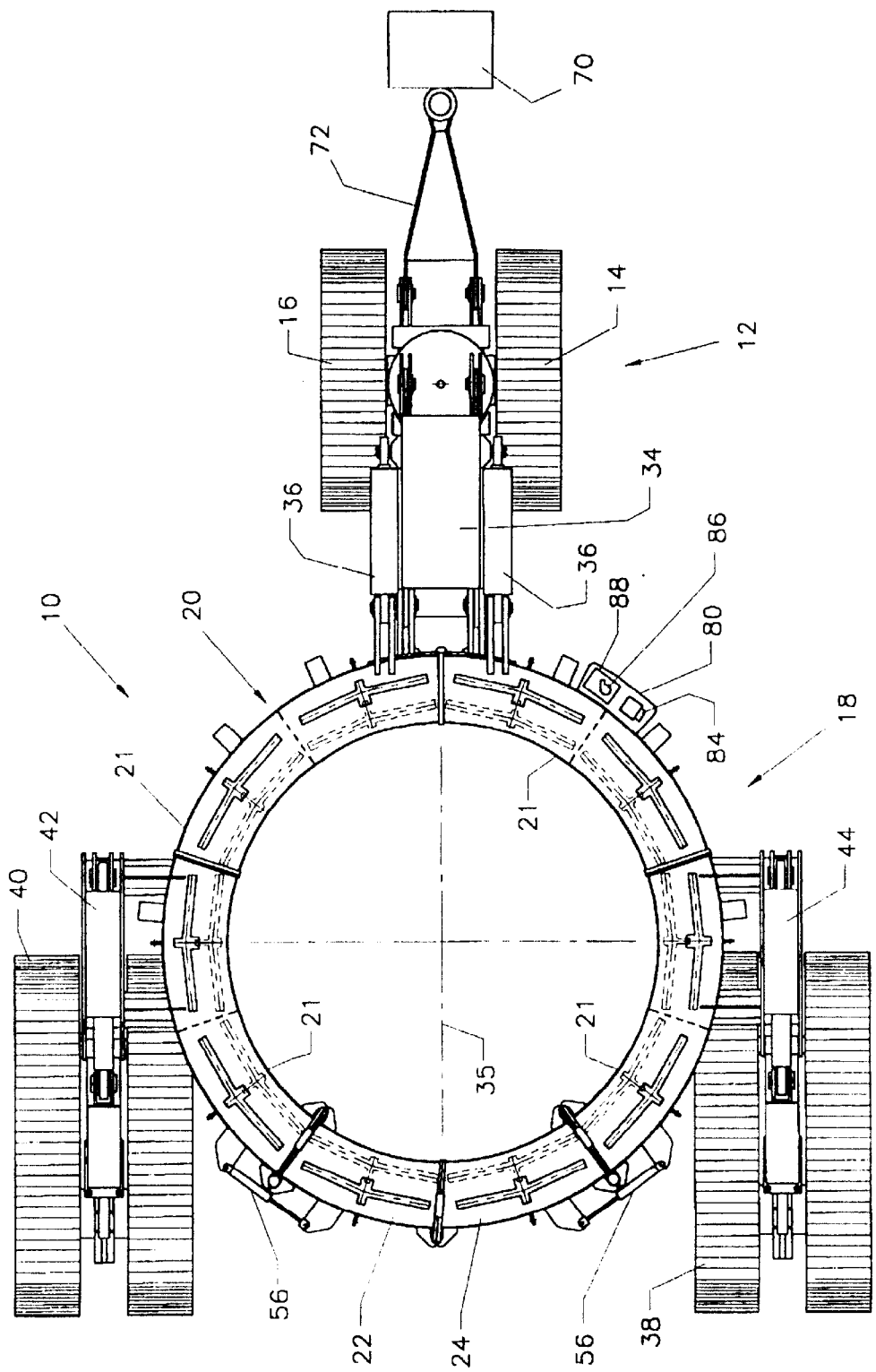
FIG. 1 is a simplified top view of the tree excavator and transplanter with the plurality of blades removed for clarity.
Figure 2:
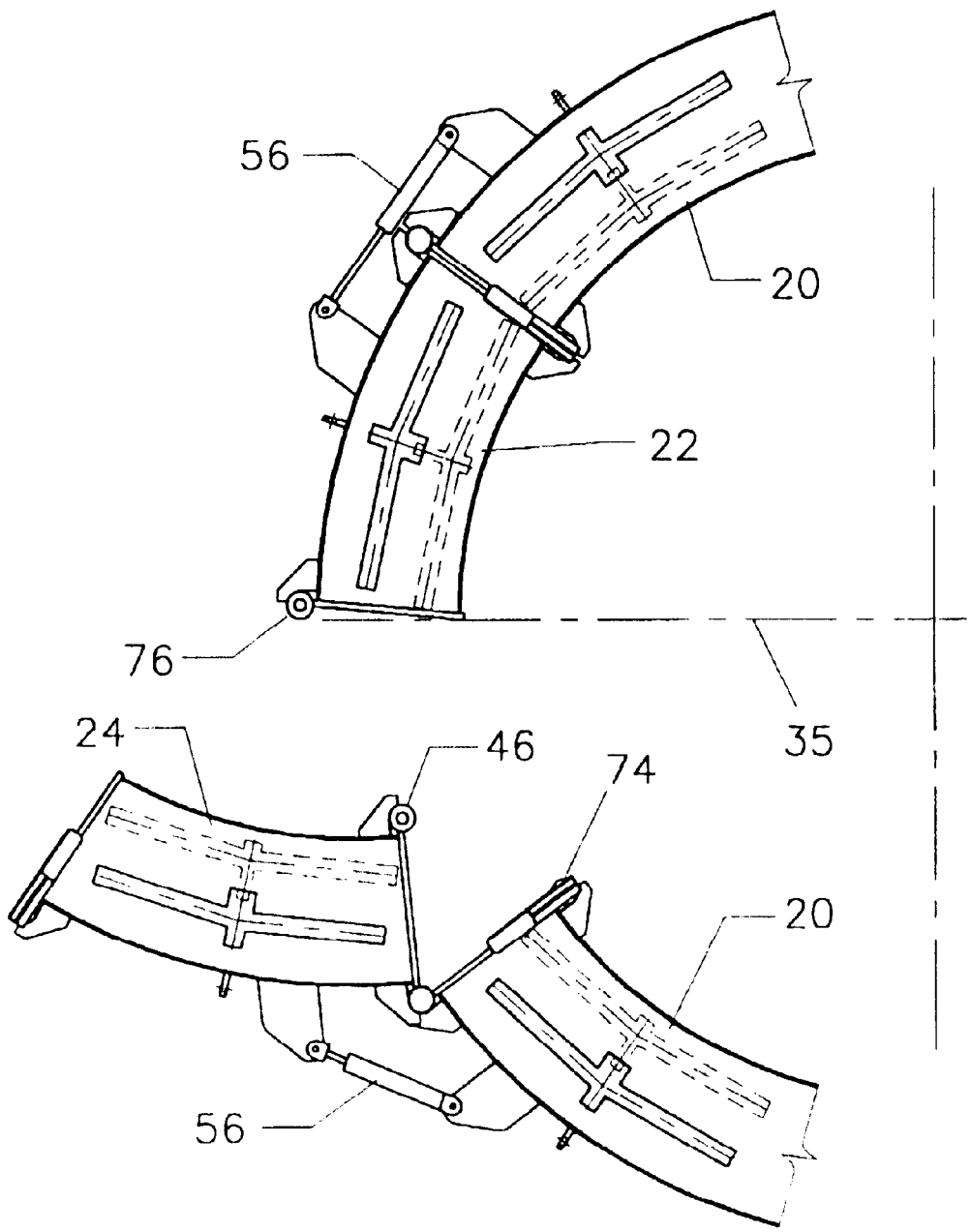
FIG. 2 is a simplified detail of FIG. 1, showing only the rear gate sections and their relation to the annular ring assembly rigid section, one of the rear gate sections being shown in the closed position, the other rear gate section being shown in the open position.
Figure 3:
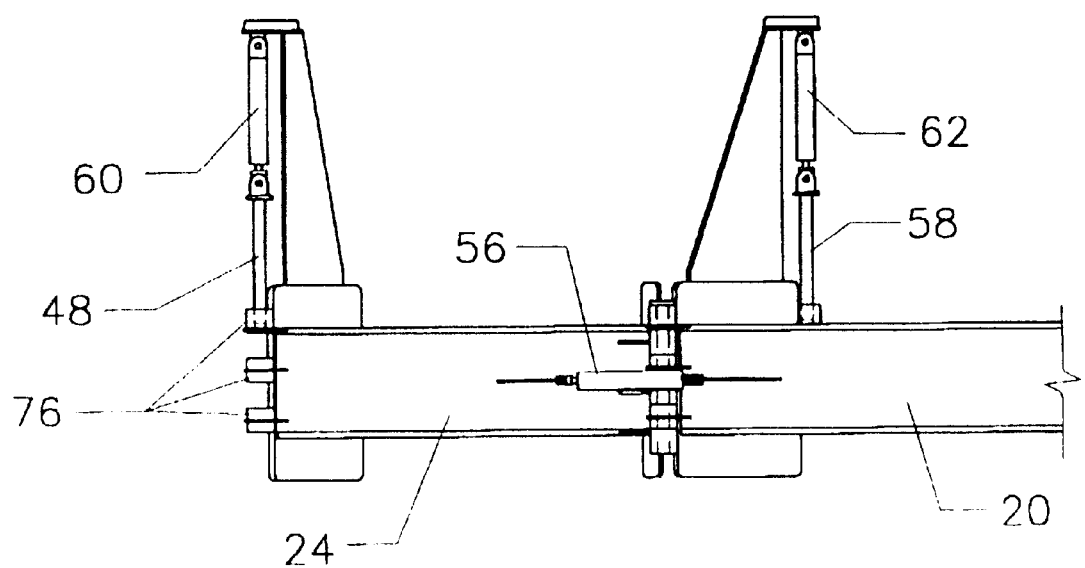
FIG. 3 is a simplified elevation view of the details illustrated in FIG. 2.
Figure 4:
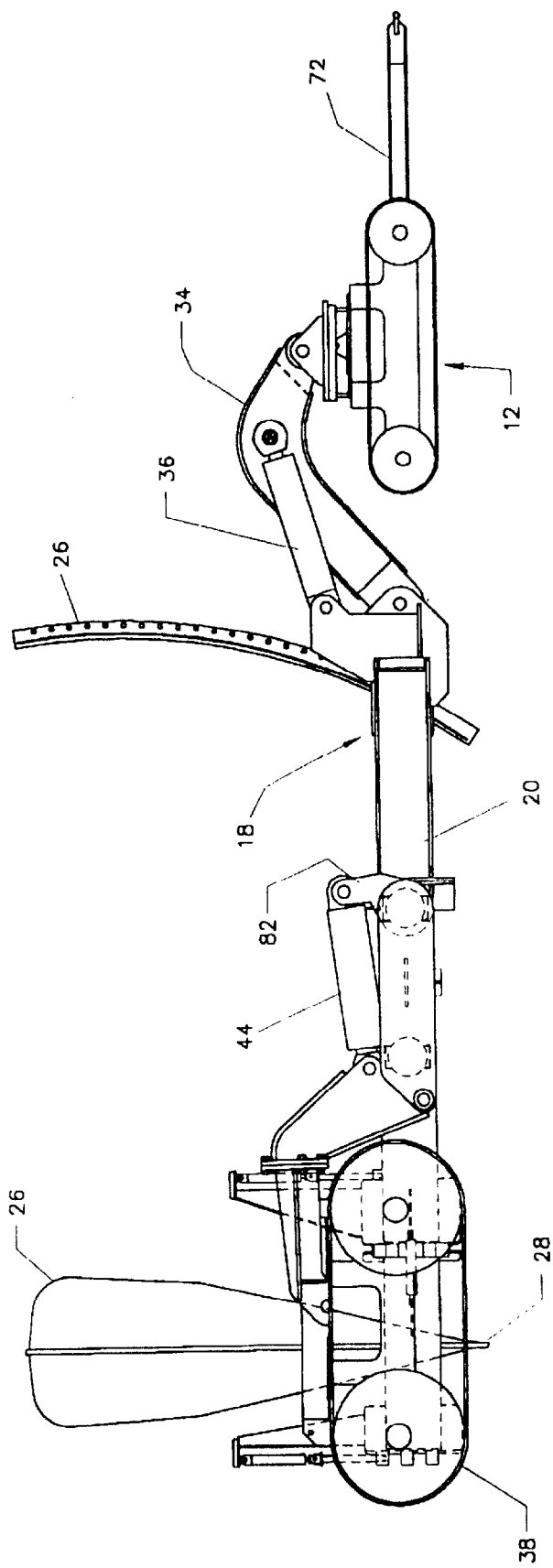
FIG. 4 is a simplified elevation view of the apparatus with the annular ring assembly in a lowered position and the plurality of blades in a raised position, the view having several of the plurality of blades removed for clarity.
Figure 5:
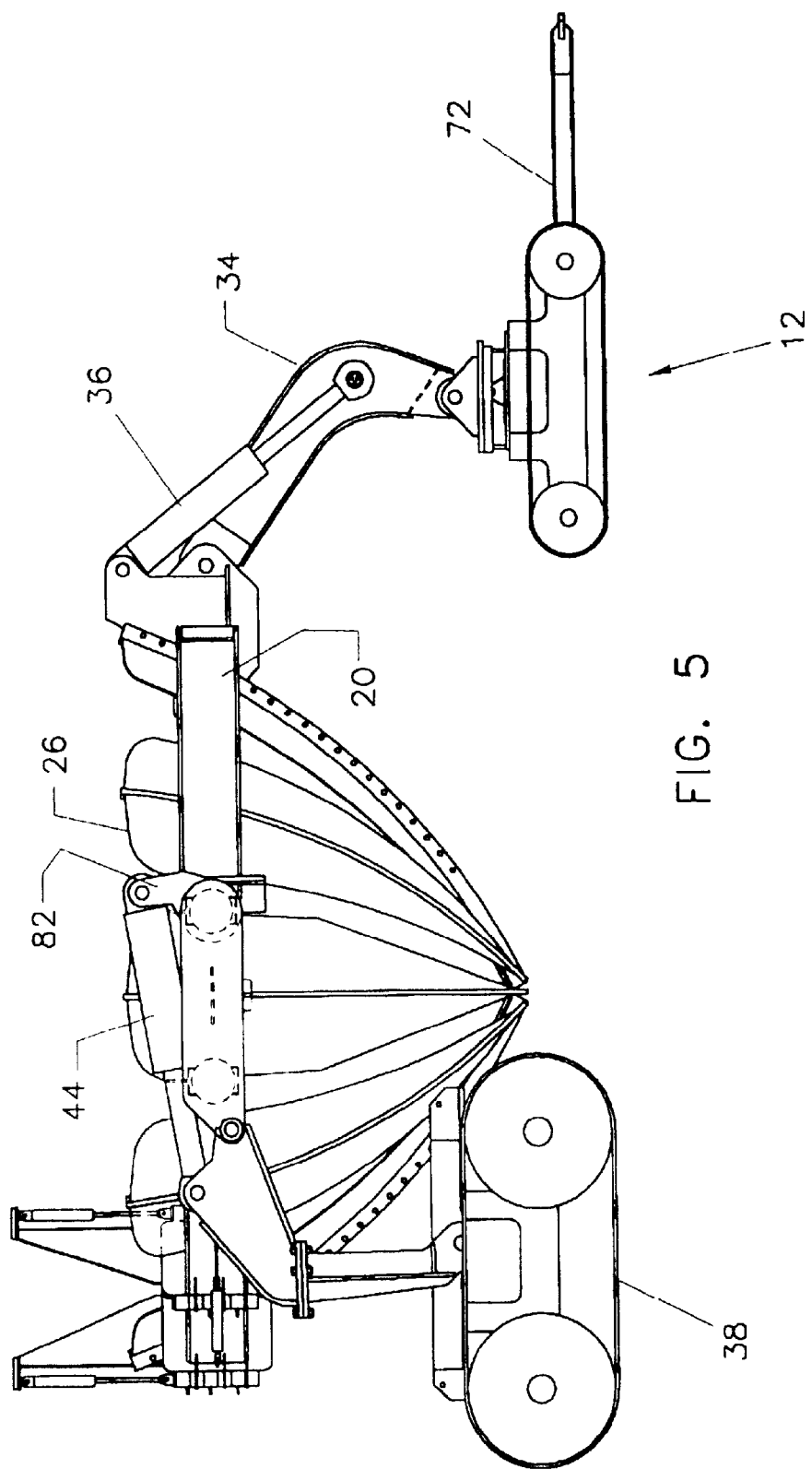
FIG. 5 is a simplified elevation view of the apparatus with the annular ring assembly in a raised position and the plurality of blades in a lowered position.
Figure 6:
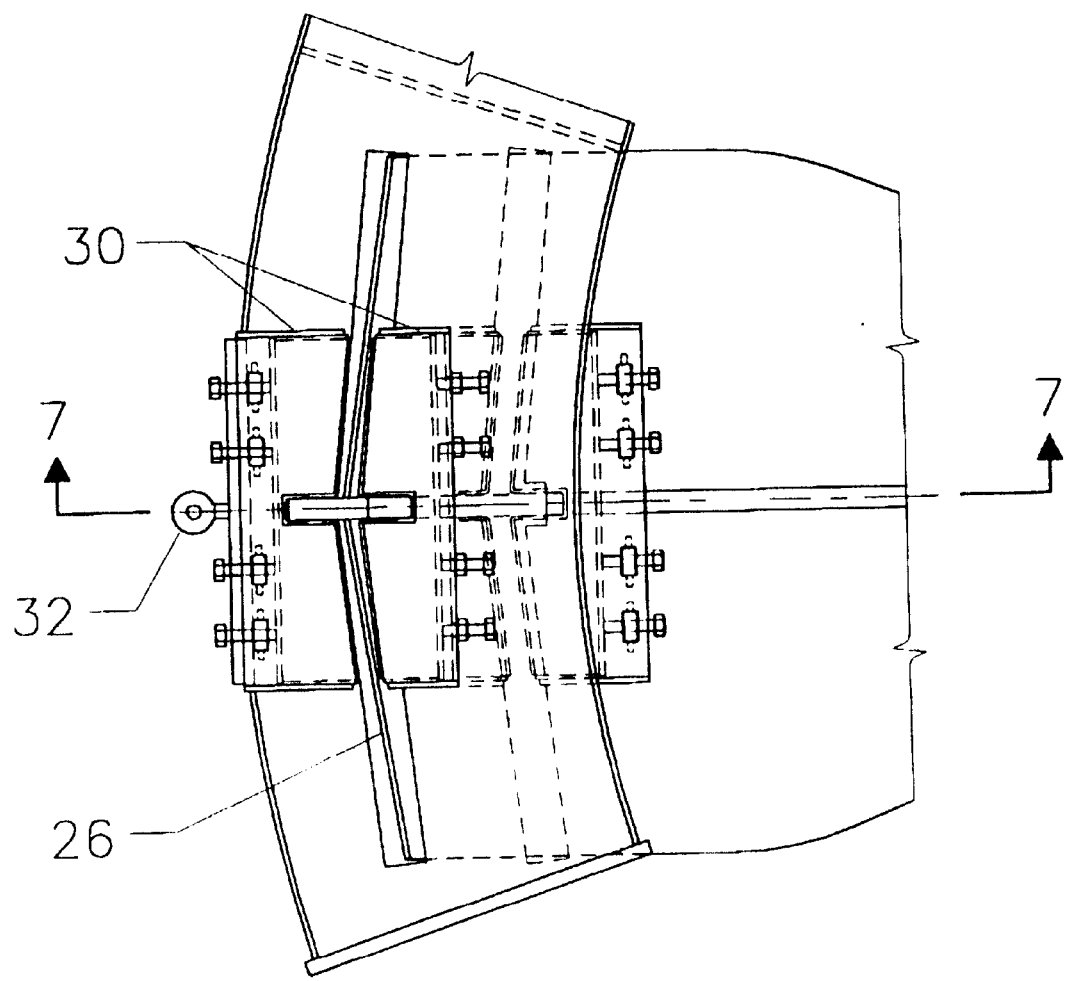
FIG. 6 is a simplified top view showing the locations one of the plurality of blades, the plurality of guides, and one of the plurality of hydraulic blade movers in relation to the annular ring assembly rigid section.
Figure 7:
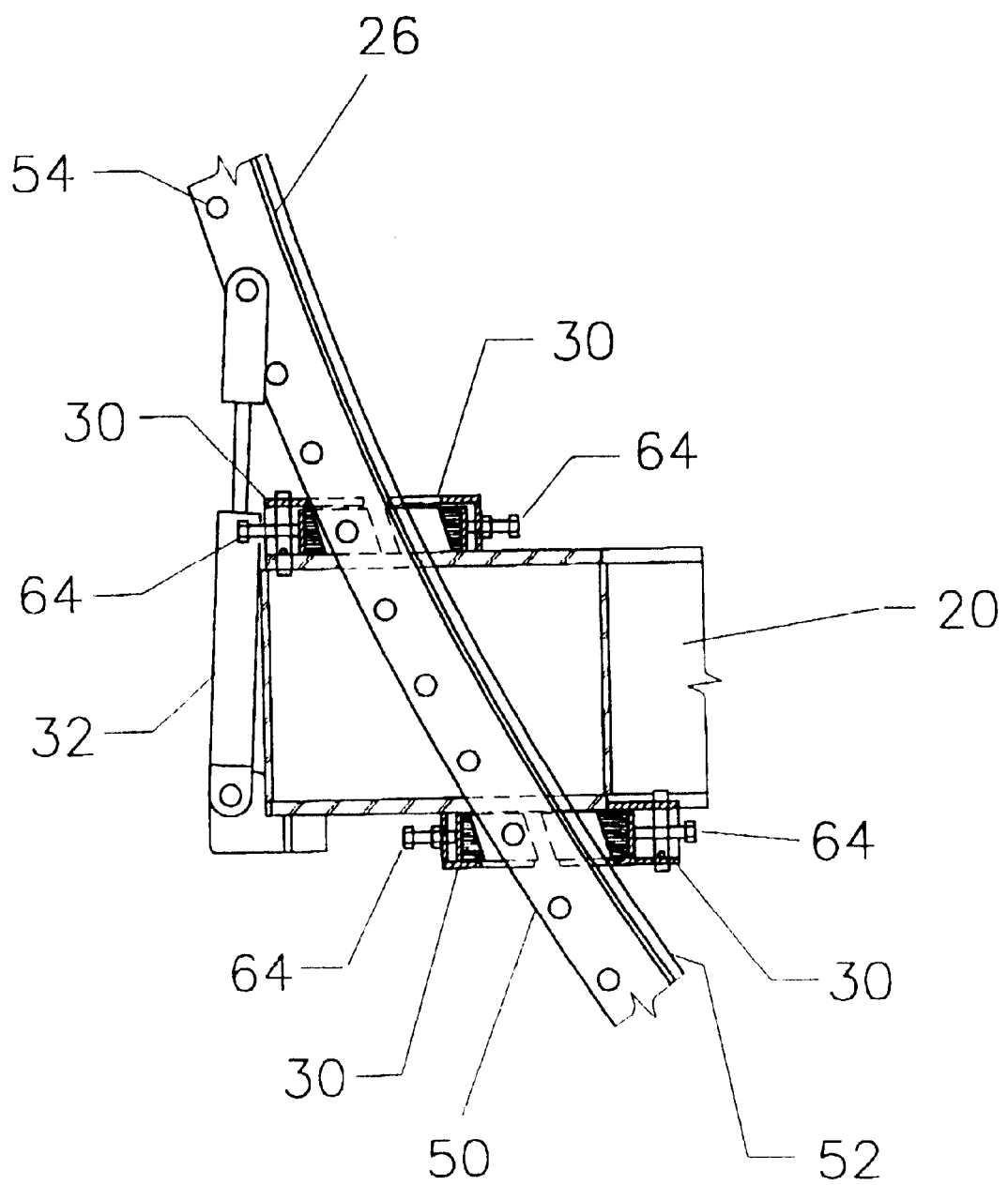
FIG. 7 is a cross-sectional view of the details illustrated in FIG. 6.

Reference is made to the attached drawings only for the purpose of demonstrating preferred embodiments and not for the purpose of limiting the same. FIG. 1 illustrates generally a tree excavating and transplanting machine 10 consisting of an annular ring assembly 18 supported by a front moveable base 12, a right rear moveable base 38, and a left rear moveable base 40. FIG. 2 illustrates in further detail a left rear gate section 22 and a right rear gate section 24, each pivotally attached to an annular ring assembly rigid section 20, as well as a pair of hydraulic gate cylinders 56 each attached to the annular ring assembly rigid section 20 and a respective rear gate section 22 and 24 for moving the rear gate sections 22 and 24 between an open position and a closed position. FIG. 3 illustrates generally the annular ring assembly rigid section 20 and right rear gate section 24 depicted in FIG. 2, as well as a securing pin 58 for securing the right rear gate section 24 to the annular ring assembly rigid section 20, a hydraulic securing cylinder 62 for moving the securing pin 58 between a secured position and an unsecured position, a locking pin 48 for locking the right rear gate section 24 to the left rear gate section 22, and a hydraulic locking cylinder 60 for moving the locking pin 48 between a locked position and an unlocked position. FIG. 4 illustrates generally the relative locations of the front moveable base 12, the rear moveable bases 38 and 40, the annular ring assembly 18, and a plurality of ground piercing blades 26, as well as the attachment points of an over-center neck mechanism 34 attached to the annular ring assembly rigid section 20 and the front moveable base 12, and a front elevating cylinder 36 attached to the annular ring assembly rigid section 20 and the over-center neck mechanism 34, while the annular ring assembly 18 is in a lowered position. FIG. 5 illustrates generally the relative locations of the front moveable base 12, the rear moveable bases 38 and 40, the annular ring assembly 18, the plurality of blades 26, the over-center neck mechanism 34, and the hydraulic elevating cylinder 36 while the annular ring assembly 18 is in a raised position. FIG. 6 and FIG. 7 illustrate generally the engagement of a plurality of guides 30 with the plurality of blades 26 in relation to the annular ring assembly rigid section 20, as well as the adjustment members 64 for radially adjusting the plurality of guides 30.

In a preferred embodiment, an annular ring assembly 18 is comprised of two rear gate sections 22 and 24 pivotally attached to a rigid section 20. The rigid section 20 is comprised of a plurality of flanged sections 21, with each flanged section 21 preferably being secured to the adjacent flanged section 21 by a plurality of peripheral flange bolts (not shown). An over-center neck mechanism 34 is pivotally attached at one end to the annular ring assembly rigid section 20 and at an opposing end to a front moveable base 12 having a centerline generally aligned with a prime mover 70 for moving the apparatus 10. A pair of hydraulic elevating cylinders 36 are positioned on opposite sides of the front base centerline 35, each of the pair of elevating cylinders 36 having one end attached to the over-center neck mechanism 34 and an opposing end attached to the annular ring assembly rigid section 20. In a preferred embodiment, the annular ring assembly 18 is further supported by a right rear moveable base 38 and a left rear moveable base 40 on respective sides of the annular ring assembly 18, the moveable bases 38 and 40 each being connected to the annular ring assembly 18 by a hydraulic elevating cylinder 44 and 42 each having one end attached to the respective base 38 and 40 and an opposing end attached to a ring assembly standoff 82 (see FIG. 4). In a preferred embodiment, the front moveable base 12 includes a left side roller 16 and a right side roller 14 each spaced laterally from the base 12 centerline outward of the over-center neck mechanism 34. In a preferred embodiment, a tow-bar 72 is attached to the front moveable base 12 for interconnecting the front moveable base 12 with the prime mover 70. The moveable bases 38 and 40 each have a left-side and right-side roller spaced laterally outward from its respective elevating cylinder.

In a preferred embodiment, a plurality of ground piercing blades 26 are arranged about the annular ring assembly 18, each blade 26 having a radius of curvature along its longitudinal axis and tapered laterally toward a lower blade apex 28 (see FIG. 4) such that the plurality of blades 26 may move into substantially circumferential engagement under a tree to sever a root ball of the tree from the ground and thereafter support the tree and root ball as the annular ring assembly 18 and the plurality of blades 26 are raised with respect to the front base 12 to lift the tree and root ball from the ground. Those skilled in the art will appreciate that the apex 28 may be spaced slightly from the lower end of a blade which is slightly rounded. In a preferred embodiment, each of the plurality of blades 26 includes an inner keel 52 and an outer keel 50 from which the blade 26 extends circumferentially outward, each outer keel 50 including a plurality of apertures 54 spaced along a length of the outer keel 50. The plurality of blades 26 are each supported on the annular ring assembly 18 by a respective one of a plurality of guides 30 circumferentially spaced around and attached to the annular ring assembly 18. In a preferred embodiment, each of the plurality of guides 30 are moveably attached to a respective one of a plurality of adjustment members 64, such that the location of each of the plurality of guides 30 may be adjusted radially inward and outward to increase or decrease the engagement of each of the guides 30 to a respective one of the plurality of blades 26, the engagement between each of the guides 30 and a respective one of the plurality of blades 26 serving to accurately guide the movement of the blade 26 with respect to the annular ring assembly 18 along a path defined by the radius of curvature of a respective blade 26, and to limit the radial and lateral movement of the blades 26 during excavation. In a preferred embodiment, each of the plurality of blades 26 is moved through the guides 30 and into the ground by a respective one of a plurality of hydraulic blade cylinders 32, each blade cylinder 32 having one end attached to a respective one of the plurality of blades 26 and an opposing end attached to the annular ring assembly 18. The inner keel 52 and the outer keel 50 may be a single component, with each blade 26 comprised of two halves each welded to a side of the keel.

In a preferred embodiment, each of the two rear gate sections 22 and 24 include a plurality of vertically spaced securing sleeves 46 for securing each of the rear gate sections 22 and 24 to the annular ring assembly rigid structure 20. Each end of the annular ring assembly rigid section 20 also includes a plurality of vertically spaced securing sleeves 74 secured radially inward to an end of the rigid section 20. Each of the plurality of annular ring assembly rigid section securing sleeves 74 is axially aligned with a respective plurality of rear gate section securing sleeves 46 secured radially inward on each of the rear gate sections 22 and 24 when the rear gate sections 22 and 24 are in a closed position, such that a vertically moveable securing pin 58 may be inserted through both a plurality of annular ring assembly rigid section securing sleeves 74 and a respective plurality of rear gate section securing sleeves 46 to secured the respective rear gate section 22 or 24 in the closed position. In a preferred embodiment, a hydraulic securing cylinder 62 is attached at one end to a respective one of the securing pins 58 and at an opposing end to the annular ring assembly 18, such that the securing cylinder 62 may move the securing pin 58 between a secured position and an unsecured position.

In a preferred embodiment, each of the two rear gate sections 22 and 24 include a plurality of vertically spaced locking sleeves 76 secured radially outward to the free end of the rear gate sections 22 and 24, each plurality of locking sleeves 76 aligning axially with the plurality of locking sleeves 76 secured to the other rear gate section 22 or 24, such that a vertically moveable locking pin 48 may be inserted simultaneously through the plurality of locking sleeves 76 on both rear gate sections 22 and 24 to lock the rear gate sections 22 and 24 to one another. In a preferred embodiment, a hydraulic locking cylinder 60 is attached at one end to the locking pin 48 and at an opposing end to the annular ring assembly 18, such that the locking cylinder 60 may move the locking pin 48 between a locking position and an unlocking position.

In a preferred embodiment, each of the hydraulic cylinders 32, 36, 42, 44, 56, 60, 62 are actuated by hydraulic power supplied by a hydraulic power unit 80 consisting of a motor 84, a fluid pump 86 and a fluid reservoir 88. The hydraulic power unit 80 is preferably rigidly secured to one side of the annular ring assembly rigid section 20. Suitable controls (not shown) are provided for operator control of the cylinders from the unit 80. Accordingly, hydraulic power from the prime mover 70 is not required to operate the machine 10.

In a preferred embodiment, each of the plurality of guides 30 is composed of ultra-high molecular weight polyethylene, although another selected plastic material may be used in other embodiments. Other embodiments may also use alternative means for moving each of the plurality of blades 26 into the ground, such as a toothed rack on the outer keel 50 on each of the plurality of blades 26 and mounting a plurality of hydraulic torque motors to the annular ring assembly 18. Each of the plurality of torque motors may be secured to a respective pinion gear engaging a toothed rack on the outer keel 50 of a respective one of the plurality of blades 26, such that by causing the torque motor to drive the respective pinion gear, the blade 26 is forced into the ground.

The invention includes a preferred process for excavating and transplanting a tree. By providing a moveable front base 12 having a centerline generally aligned with a prime mover 70 for moving the tree, supporting an annular ring assembly 18 on the moveable base 12, the annular ring assembly 18 including a pair of rear gate sections 22 and 24 and a rigid section 20 comprised of a plurality of flanged sections 21 secured to one another, pivotally attaching one end of an over-center neck mechanism 34 to the annular ring assembly rigid section 20 and an opposing end to the moveable base 12, positioning a pair of hydraulic elevating cylinders 36 on opposite sides of the over-center neck mechanism 34 and attaching one end of each of the pair of hydraulic elevating cylinders 36 to the over-center neck mechanism 34 and an opposing end to the annular ring assembly rigid section 20, a plurality of ground piercing blades 26 may be moveably supported circumferentially around the annular ring assembly 18. This apparatus 10 may then be positioned around a tree to be excavated by opening the rear gate sections 22 and 24, thereafter using the prime mover 70 to position the apparatus 10 around the tree, thereafter closing the rear gate sections 22 and 24, thereafter securing the rear gate sections 22 and 24 to the annular ring assembly rigid section 20 by actuating a pair of hydraulic securing cylinders 62 to each move a respective one of a pair of securing pins 58 into a secured position engaging both a plurality of rear gate section securing sleeves 46 which are secured to a radially inward surface on each of the rear gate sections 22 and 24 and a plurality of annular ring assembly rigid section securing sleeves 74 which are secured to a radially inward surface of both ends of the annular ring assembly rigid section 20, and thereafter locking the rear gate sections 22 and 24 to one another by actuating a locking cylinder 60 to move a locking pin 48 to a locked position engaging a plurality of rear gate section locking sleeves 76 secured to a radially outward surface of both rear gate sections 22 and 24. By further mounting a plurality of hydraulic blade cylinders 32 each on one end to the annular ring assembly 18 and an opposing end to a respective one of the plurality of blades 26, and mounting a plurality of guides 30 to the annular ring assembly 18, each of the plurality of blades 26 may be driven into the ground and underneath the tree to be excavated. The annular ring assembly 18 and the plurality of blades 26 may then be raised relative to the front base 12, thereby excavating the tree and a root ball for subsequent transplantation.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. An apparatus for excavating and transplanting a tree, comprising:

a moveable base having a centerline generally aligned with a prime mover for moving the apparatus, the base including one or more rollable base supports on a respective left side and right side of the base centerline;

an annular ring assembly supported on the moveable base and including a rigid section and one or more rearward pivotable gate sections for positioning the annular ring assembly circumferentially around the tree;

a plurality of ground piercing blades circumferentially arranged about the annular ring assembly, each blade having a radius of curvature along its longitudinal axis and tapered laterally toward a lower blade apex such that the plurality of blades may move into substantially circumferential engagement under the tree to sever a root ball of the tree from the ground and thereafter support the tree and root ball as the annular ring assembly and the plurality of blades are raised with respect to the base to lift the tree and root ball from the ground;

a plurality of vertically spaced guides spaced circumferentially around the annular ring assembly for guiding movement of the plurality of blades with respect to the annular ring assembly along paths each defined by the radius of curvature of a respective blade;

a plurality of hydraulic blade movers to move a respective blade relative to the annular ring assembly;

an over-center neck mechanism having one end pivotally attached to the base and an opposing end pivotally attached to a front portion of the rigid section of the annular ring assembly; and at least one hydraulic elevating cylinder for raising and lowering the annular ring assembly relative to the base.

2. The apparatus defined in claim 1, wherein the at least one hydraulic elevating cylinder includes a pair of hydraulic elevating cylinders positioned on opposite sides of the base centerline, each of the pair of hydraulic elevating cylinders having one end attached to the over-center neck mechanism and an opposing end attached to the rigid section of the annular ring assembly.

3. The apparatus as defined in claim 2, wherein each of the pair of hydraulic elevating cylinders is spaced laterally from the base centerline with respect to the over-center neck mechanism.

4. The apparatus defined in claim 1, wherein:

the moveable base comprises one or more front rollable base supports; and one or more left side rear rollable base supports and one or more right side rear rollable base supports, each left side and right side rear base supports being moveable along the base centerline relative to the one or more front rollable base supports.

5. The apparatus as defined in claim 4, wherein the one or more front rollable base supports comprises a left side front roller and a right side front roller each spaced laterally from the base centerline outward the neck mechanism.

6. The apparatus as defined in claim 5, further comprising:
a tow-bar for interconnecting the one or more front rollable base supports with the prime mover.

7. The apparatus defined in claim 4, further comprising:
a left side rear hydraulic elevating cylinder and a right side rear hydraulic elevating cylinder, each rear hydraulic elevating cylinder having one end attached to a respective rear rollable base support and an opposing end attached to the annular ring assembly.

8. The apparatus defined in claim 1, further comprising:
one or more vertically moveable rearward gate section securing pins securing the one or more rearward gate sections to the rigid section of the annular ring assembly.

9. The apparatus defined in claim 1, the plurality of blades further comprising:
a longitudinal keel; and
a pair of blade halves secured to and extending circumferentially outward from opposite sides of the longitudinal keel.

10. The apparatus defined in claim 9, wherein each outer keel of a respective one of the plurality of blades includes a plurality of apertures along a longitudinal length of the keel, and each of the plurality of hydraulic blade movers is a hydraulic blade cylinder attached at one end to one of the plurality of apertures in a respective outer keel, an opposing end of the hydraulic blade cylinder attached to the annular ring assembly to move a respective one of the plurality of blades relative to the annular ring assembly in a step by step manner by moving one end of the hydraulic blade cylinder from one outer keel aperture to another outer keel aperture.

11. The apparatus defined in claim 1, wherein the plurality of vertically spaced guides includes a plurality of plastic material guide blocks, each guide block engaging a respective one of the plurality of blades to limit radial movement of the blade and force the blade to follow the respective radius of curvature.

12. The apparatus defined in claim 1, further comprising:
a hydraulic power unit, including a motor, a fluid pump and a fluid reservoir, to supply hydraulic power to the hydraulic cylinders and hydraulic movers.

13. An apparatus for excavating and transplanting a tree, comprising:
a moveable base having a centerline generally aligned with a prime mover for moving the apparatus, the base including one or more rollable base supports on a respective left side and right side of the base centerline;
an annular ring assembly supported on the moveable base and including a rigid section and a pair of rearward pivotable gate sections pivotally attached to the rigid section for positioning the annular ring assembly circumferentially around the tree;
a plurality of ground piercing blades circumferentially arranged about the annular ring assembly, each blade having a radius of curvature along its longitudinal axis and tapered laterally toward a lower blade apex such that the plurality of blades may move into substantially circumferential engagement under the tree to sever a root ball of the tree from the ground and thereafter support the tree and root ball as the annular ring assembly and the plurality of blades are raised with respect to the base to lift the tree and root ball from the ground;
a plurality of vertically spaced guides spaced circumferentially around the annular ring assembly for guiding movement of the plurality of blades with respect to the annular ring assembly along paths each defined by the radius of curvature of a respective blade;
a plurality of hydraulic blade movers to move a respective blade relative to the annular ring assembly;
a pair of hydraulic gate cylinders each for opening and closing a respective one of the pair of rearward gate sections with respect to the rigid section of the annular ring assembly; and
a vertically moveable rearward gate section locking pin securing the pair of rearward gate sections to one another.

14. The apparatus defined in claim 13, further comprising:
a hydraulic locking cylinder for vertically moving the rearward gate section locking pin between an unlocking position and a locking position.

15. The apparatus defined in claim 13, wherein each of the pair of rearward gate sections includes a plurality of vertically spaced locking sleeves for receiving the rearward gate section locking pin to secure the two rearward gate sections to one another.

16. The apparatus defined in claim 13, further comprising:
a pair of vertically moveable rearward gate section securing pins each securing a respective one of the pair of rearward gate sections to the rigid section.

17. The apparatus defined in claim 16, further comprising:
a pair of hydraulic securing cylinders each for vertically moving a respective one of the pair of rearward gate section securing pins between an unlocking position and a locking position.

18. The apparatus defined in claim 13, wherein each of the pair of rearward gate sections includes a plurality of vertically spaced securing sleeves for rigidly securing a respective one of the pair of rearward gate sections to the rigid section of the annular ring assembly.

19. The apparatus as defined in claim 18, wherein each of the pair of rearward gate sections includes a radially outward pivot axis for pivotally rotating a respective one of the pair of rearward gate sections between an open position and a closed position; and the plurality of vertically spaced securing sleeves on each rearward gate section is positioned radially inward of a respective rearward gate section.

20. The apparatus defined in claim 13, wherein the moveable base comprises:
one or more front rollable base supports including a left side front roller and a right side front roller each spaced laterally from the base centerline with respect to an over-center neck mechanism;
one or more left side rear rollable base supports; and
one or more right side rear rollable base supports.

21. The apparatus defined in claim 13, wherein the at least one hydraulic elevating cylinder includes a pair of hydraulic elevating cylinders positioned on opposite sides of the base centerline.

22. The apparatus defined in claim 13, wherein each of the plurality of blades includes a longitudinal outer keel and a pair of blade halves secured to and extending circumferentially outward from opposite sides of the longitudinal keel, the longitudinal keel further including a plurality of apertures spaced along a length of the longitudinal keel, and each of the plurality of hydraulic blade movers is a hydraulic blade cylinder attached at one end to one of the plurality of apertures in a respective outer keel and at an opposing end attached to the annular ring assembly to move a respective one of the plurality of blades relative to the annular ring assembly in a step by step manner by moving one end of the hydraulic blade cylinder from one outer keel aperture to another outer keel aperture.

23. The apparatus defined in claim 13, further comprising:
a hydraulic power unit, including a motor, a fluid pump and a fluid reservoir, to supply hydraulic power to the hydraulic cylinders and hydraulic movers, the hydraulic power unit rigidly secured to one side of the annular ring assembly rigid section.

24. An apparatus for excavating and transplanting a tree, comprising:
a moveable base having a centerline generally aligned with a prime mover for moving the apparatus, the base including one or more rollable base supports on a respective left side and right side of the base centerline;
an annular ring assembly supported on the moveable base and including a rigid section and one or more rearward pivotable gate sections for positioning the annular ring assembly circumferentially around the tree;
a plurality of ground piercing blades circumferentially arranged about the annular ring assembly, each blade having a radius of curvature along its longitudinal axis and tapered laterally toward a lower blade apex such that the plurality of blades may move into substantially circumferential engagement under the tree to sever a root ball of the tree from the ground and thereafter support the tree and root ball as the annular ring assembly and the blades are raised with respect to the base to lift the tree and root ball from the ground;
a plurality of hydraulic blade movers to move a respective blade relative to the annular ring assembly;
a plurality of vertically spaced guides spaced circumferentially around the annular ring assembly for guiding movement of the plurality of blades with respect to the annular ring assembly along paths each defined by the radius of curvature of a respective blade, the plurality of guides including a plurality of plastic material guide blocks, each guide block engaging a respective one of the plurality of blades to limit radial movement of the blade and force the blade to follow the respective radius of curvature; and
a plurality of radial adjustment members for adjusting the radial position of the guide blocks with respect to the annular ring assembly to compensate for wear of the plurality of guide blocks.

25. The apparatus defined in claim 24, wherein the plurality of plastic material guide blocks are composed of ultra-high molecular weight polyethylene material.

26. The apparatus defined in claim 24, wherein each of the plurality of blades includes a longitudinal outer keel and a pair of blade halves secured to and extending circumferentially outward from opposite sides of the outer keel, and a respective one of the plurality of plastic material guides engages with the outer keel of a respective one of the plurality of blades to limit lateral movement of the blade.

27. The apparatus defined in claim 24, wherein each of the plurality of blades includes a longitudinal keel and a pair of blade halves secured to and extending circumferentially outward from opposite sides of the keel between a radially inward surface and a radially outward surface of the keel, the blade halves thereby demarcating the keel into an outer keel and an inner keel, and a respective one of the plurality of plastic material guides engages with the inner keel of a respective one of the plurality of blades to limit lateral movement of the blade, and a respective one of the plurality of plastic material guides engages with the outer keel of a respective one of the plurality of blades to limit lateral movement of the blade.

28. The apparatus defined in claim 26, wherein each of the outer keels of each of the plurality of blades includes a plurality of apertures spaced along the length of the outer keel, and each of the plurality of hydraulic blade movers is a hydraulic cylinder and is attached on one end to the annular ring assembly and attached on an opposing end to one of the plurality of apertures in the outer keel to move a respective one of the plurality of blades relative to the annular ring assembly in a step by step manner by moving one end of the hydraulic blade cylinder from one outer keel aperture to another outer keel aperture.

29. The apparatus defined in claim 24, wherein the at least one hydraulic elevating cylinder includes a pair of hydraulic elevating cylinders positioned on opposite sides of the base centerline, each of the pair of hydraulic elevating cylinders having one end attached to an over-center neck mechanism and an opposing end attached to the rigid section of the annular ring assembly.

30. The apparatus defined in claim 24, wherein:
the moveable base includes one or more front rollable base supports; and
one or more left side rear rollable base supports and one or more right side rear rollable base supports, each left side and right side rear base support being moveable along the base centerline relative to the one or more front rollable base supports.

31. The apparatus defined in claim 24, further comprising:
one or more vertically moveable rearward gate section securing pins securing the one or more rearward gate sections to the rigid section of the annular ring.

32. The apparatus defined in claim 24, further comprising:
a hydraulic power unit, including a motor, a fluid pump and a fluid reservoir, to supply hydraulic power to the hydraulic blade movers, the hydraulic power unit rigidly secured to one side of the annular ring assembly rigid section.

33. A method of excavating and transplanting a tree, comprising:
providing a moveable base having a centerline generally aligned with a prime mover for moving the tree;
mounting the base on one or more rollable supports on a respective left side and right side of the base centerline;
supporting an annular ring assembly on the moveable base including a rigid section and one or more gate sections pivotally attached to the rigid section;
pivotally attaching one end of an over-center neck mechanism to a front portion of the moveable base;
pivotally attaching an opposing end of the over-center neck mechanism to the rigid section of the annular ring assembly;
providing one or more elevating mechanisms to pivot the over-center neck mechanism relative to the base to elevate the annular ring assembly;
moveably supporting a plurality of ground piercing blades circumferentially on the annular ring assembly;
guiding the plurality of ground piercing blades during movement of the plurality of blades with respect to the annular ring assembly;
mounting a plurality of blade movers each to the annular ring assembly at one end and at an opposing end to a respective one of the plurality of blades to move the plurality of blades with respect to the annular ring assembly;
opening the one or more gate sections;
thereafter positioning the annular ring assembly around the tree;

thereafter closing the one or more gate sections;

thereafter actuating the plurality of blade movers to move the plurality of blades into the ground and sever a root ball of the tree from the ground;

thereafter actuating the one or more elevating mechanisms to raise the annular ring assembly relative to the base, thereby raising the tree and root ball supported by the plurality of blades; and transporting the tree and root ball for subsequent transplantation.

34. The method defined in claim 33, further comprising:

locking the one or more gate sections in a closed position after closing the one or more gate sections and prior to actuating the plurality of blade movers.

35. The method defined in claim 33, further comprising:

mounting a plurality of locking sleeves to each of the one or more gate sections for locking the one or more gate sections in a closed position.

36. The method defined in claim 33, further comprising:

adjusting a position of the plurality of blade guides relative to the annular ring assembly to limit radial movement of the plurality of blades during movement with respect to the annular ring assembly.

37. The method defined in claim 33; wherein each of the plurality of blade movers is a hydraulic blade cylinder attached at one end to the ring assembly and at an opposing end to a respective one of the plurality of blades, each of the hydraulic cylinders moving a respective one of the plurality of blades relative to the annular ring assembly in a step by step manner by moving one end of the respective hydraulic blade cylinder from one point along the length of the respective one of the plurality of blades to another point along the length of the respective one of the plurality of blades.

38. The method defined in claim 33, further comprising:

supplying power to the plurality of blade movers and elevating mechanisms from a hydraulic power unit, including a motor, a fluid pump and a fluid reservoir, the hydraulic power unit rigidly secured to one side of the annular ring assembly rigid section.

* * * * *